United States Patent Office 3,001,618
Patented Sept. 26, 1961

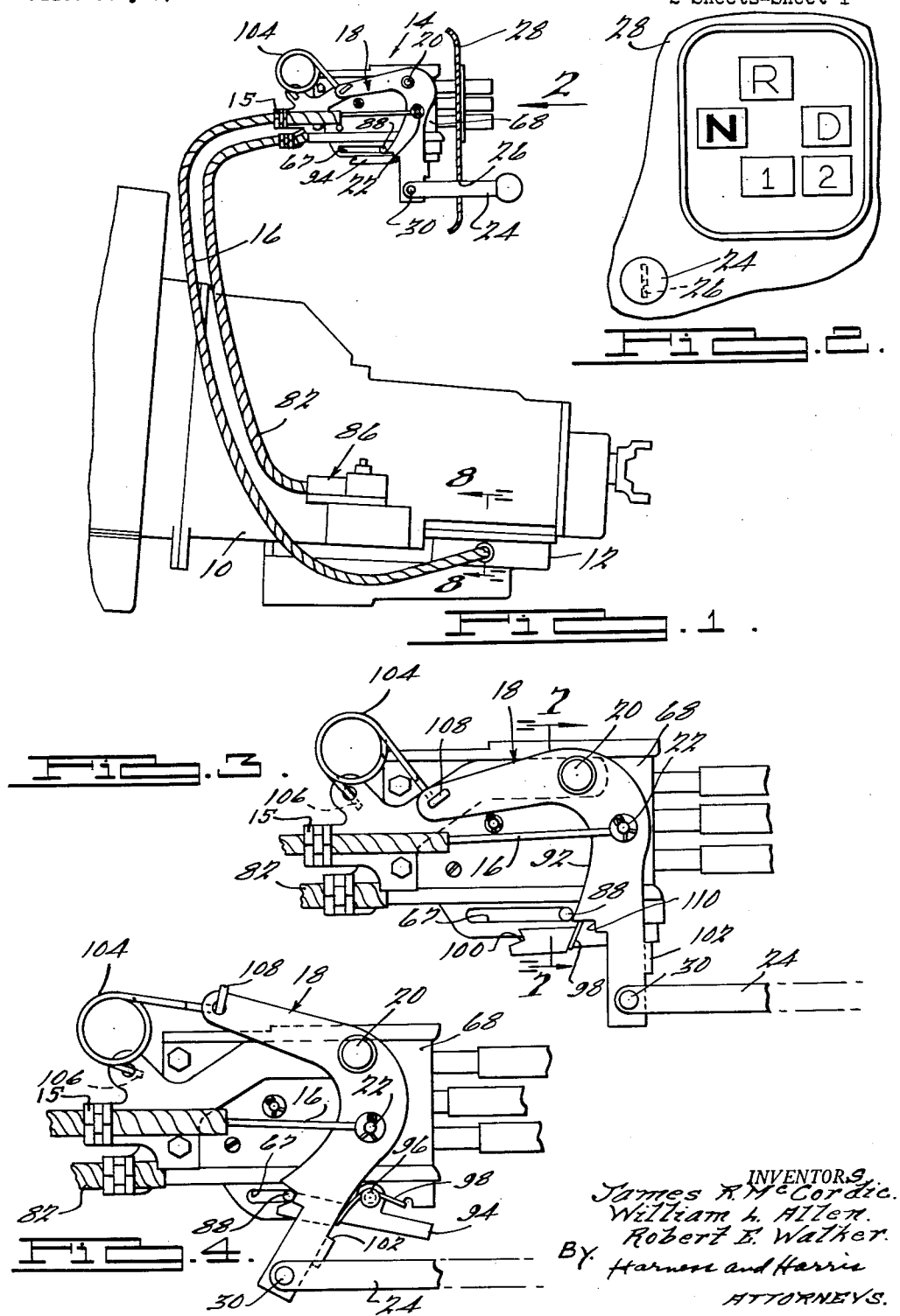

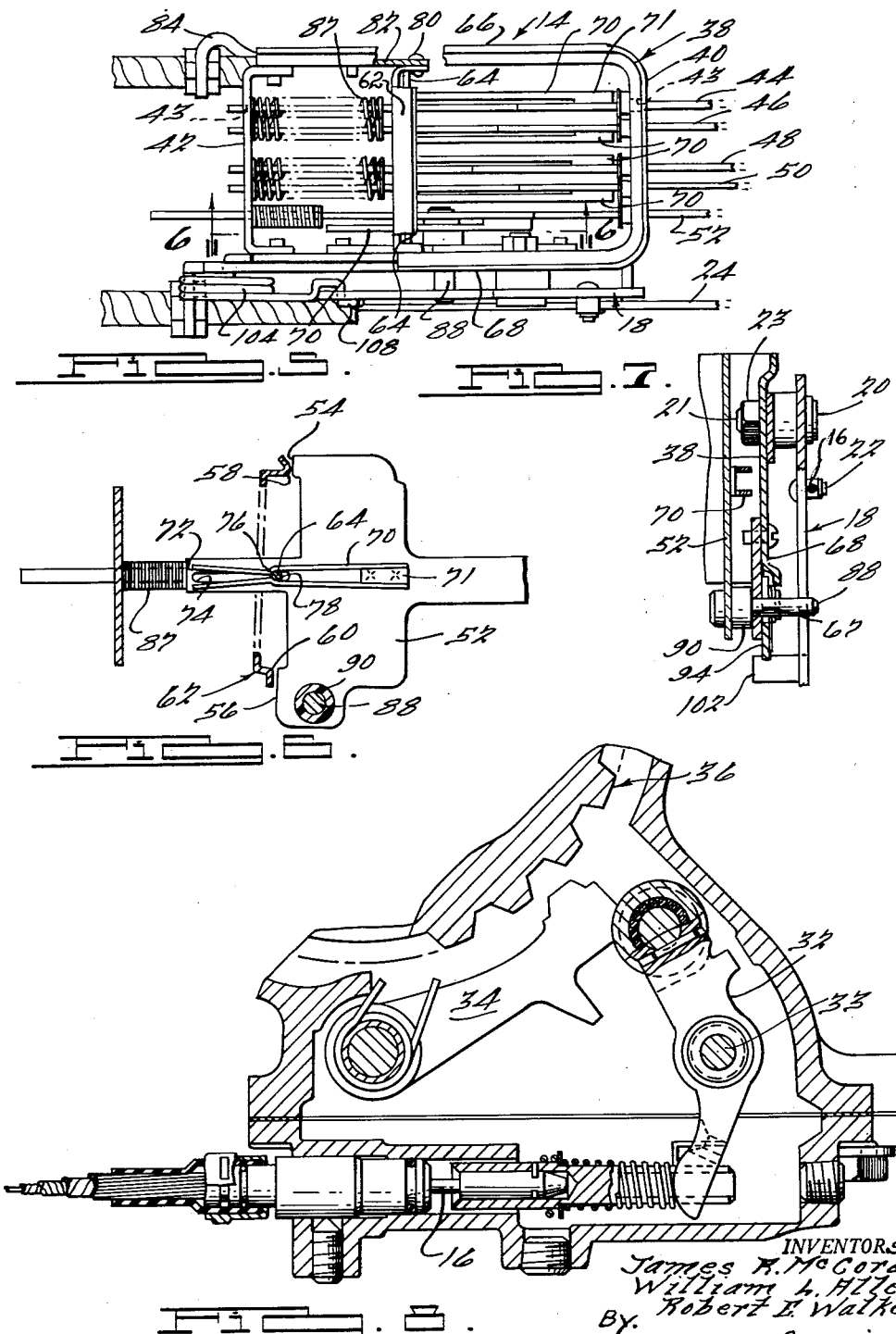

3,001,618
PARKING SPRAG ACTUATOR
James R. McCordic, Royal Oak, William L. Allen, Birmingham, and Robert E. Walker, Madison Heights, Mich., assignors to Chrysler Corporation, Highland Park, Mich., a corporation of Delaware
Filed July 7, 1959, Ser. No. 825,553
3 Claims. (Cl. 192—4)

This invention relates to transmission selector units having incorporated therein parking sprag actuator means operable only during certain positions of transmission speed range selecting portions of the selector unit.

The invention concerns a novel cooperating construction of a selector unit and a parking sprag actuating means which eliminates the possibility of having the parking sprag engaged while the transmission is in a driving gear. The conventional parking sprags are often of such construction that it is possible to apply torque to the output gearing of the transmission while the parking sprag is engaged with the obvious result of parking gear and/or parking sprag damage.

Applicants have eliminated such problems in the present invention by operatively connecting the sprag actuating structure to the neutral slide of the transmission selector unit. The sprag actuator and the neutral push-button slide are so arranged that operation of the sprag actuator to an active locking position will automatically actuate the neutral push-button to place the transmission gearing in a neutral operating condition.

It is a principal object of this invention to provide a parking sprag actuator and a transmission selector unit with cooperating structure to eliminate the possibility of having the parking sprag in operative position while the transmission is in a driving gear, so as to prevent damage to either the parking sprag or the parking gear.

A specific object is to provide means on the sprag actuating lever for actuating the neutral selector slide of a transmission selector unit upon actuation of the lever to its active locking position.

Further objects and advantages of the present invention will become apparent from the following description and drawings, in which:

FIGURE 1 represents a side assembly view of a transmission and a selector unit having a sprag actuating structure thereon.

FIGURE 2 represents a front view of the push-button mechanism of FIGURE 1.

FIGURE 3 represents a side view of the sprag actuator in its inactive position.

FIGURE 4 represents a side view of the sprag actuator in its active position.

FIGURE 5 represents a top view of the transmission selector unit.

FIGURE 6 represents a side view of the neutral push-button viewed along the line 6—6 of FIGURE 5 in the direction of the arrows.

FIGURE 7 represents a cross-sectional view of the sprag actuating structure of FIGURE 3 taken along the line 7—7 thereof in the direction of the arrows.

FIGURE 8 represents a partial cross-sectional view of the parking sprag structure.

Referring to the drawings, a transmission 10 is provided with a parking sprag section 12, which communicates with a selector unit 14 through a cable 16. The selector unit 14 is provided with a sprag actuating lever 18 pivotally mounted at pivot point 20 by a bolt 21 and nut 23 to the side of the selector unit 14, and the cable 16 mounted on unit 14 by bracket 15 is connected at 22 to said actuator lever. A handle 24 which may be slidably mounted in a slot 26 in the instrument panel 28 of a vehicle is pivotally mounted at 30 to the actuating lever 18 for rotating said lever either clockwise or counterclockwise. Clockwise rotation of lever 18 will move the cable 16 to the right as shown in FIGURE 8 to urge the sprag actuating arm 32 to which cable 16 is connected in a counterclockwise direction around its pivot 33 to cam sprag arm 34 into the teeth of the parking gear 36. The specific structure of the sprag mechanism does not form a part of this invention and is more fully explained in copending application Serial No. 825,582.

The push-button actuated selector unit 14 comprises a push-button support or housing 38 having a rear wall 40 and a front wall 42 provided with aligned slots 43 serving as bearing means for the push-button slides 44, 46, 48, 50, and 52. As shown in FIGURE 6, in describing the structure of the neutral push-button slide 52, which is representative of the structure of the other drive push-button slides, these slides are each provided with an upper cam surface 54 and a lower cam surface 56, which will contact the upper and lower stop portions 58 and 60 of an output member 62 pivotally mounted on shaft 64 extending between the side walls 66 and 68 of the housing 38. A positioning spring 70 secured to each of these push-button slides at 71 has a fork shape and accommodates at its open end 72 the pivot or locking pin 64 upon which the sides of slot 74 in each of the slides rides until the pin moves beyond the restrictive portions 76 of each of the springs 70 to engage the locking shoulders 78 of each of the springs to resiliently maintain each of the push-button slides in a different predetermined position with respect to the output member 62. Connected to a lower portion of the output member 62, as shown in FIGURE 5 at 80, is a transmission speed range selection cable 82 mounted on the housing 38 by bracket 84 and operatively connected to the shifting unit 86 of the transmission in a conventional manner, as shown for example in Patent No. 2,847,874. Actuation of each push-button slide will rotate member 62 in a direction which will force the already actuated slide into its released position with the aid of springs 87.

The neutral push-button slide in the present instance is provided with a pin 88 surrounded by a bearing 90 and, as shown in FIGURE 7, extends outwardly through slot 67 in the side wall 68 of the housing 38 and is engageable by a ramp surface 92 on lever 18 as the lever is moved clockwise around its pivot 20. The ramp 92 upon continued clockwise rotation of lever 18 will move the pin 88 and slide 52 to the left, as seen in FIGURE 3, until locking pin 64 moves into its locking position behind shoulders 78 on the spring 70 to maintain the neutral slide in its active neutral position so as to position the output member 62 and transmission selection cable 82 in a position establishing a neutral gearing condition in the transmission.

A safety catch 94 is pivotally mounted at 96 to the side 68 of the selector unit and is biased in a clockwise direction by a spring 98. A notch 100 in the end of the safety catch 94 will engage and contain the abutment pin 88 of slide 52 as the pin 88 slides off of ramp 92. As the safety catch so engages the pin 88, it becomes impossible to remove the selector unit from its neutral position by attempted actuation of any of the other push-button slides and thereby prevents any possibility of simultaneously engaging the parking sprag and the drive gearing of the transmission. As the actuating lever 18 is rotated counterclockwise by pulling handle 24 to the right of FIGURE 1, a safety catch release segment 102 on lever 18 will engage the underside of safety catch 94 and force the catch in a counterclockwise direction around its pivot 96 to disengage the notch 100 from the pin 88. As this occurs the parking sprag will be completely disengaged from the parking gear 36 and the selector unit and transmission will be in their neutral positions and actuation thereafter of any of the other push-buttons may be readily accomplished.

A coiled spring 104 is pivotally secured at one end 106 to a portion of the housing 38 and at its other end 108 to the lever 18 to urge the lever 18 clockwise when the point 108 is above the plane passing through points 20 and 106, and to urge the lever counterclockwise when the point 108 is below the plane through points 20 and 106. This spring arrangement acts as an overcentering device to prevent only partial movement of the sprag actuating structure. The clockwise motion of the lever is limited by the shoulder 110 on the lever which shoulder abuts pin 88 as the pin drops off of the ramp 92.

What is claimed is:

1. In a push button transmission selector unit having neutral selection slide means, sprag lock actuating means associated with said neutral selection slide means for actuating a sprag lock, said lock being operable only when said neutral selection slide means is in its neutral selection position, shoulder means on said actuating means engageable with abutment means on said slide means for moving said slide means to its neutral selection position.

2. In a push button transmission selector unit having neutral selection means and drive selection slide means, sprag lock actuating means associated with said neutral selection slide means for actuating a sprag lock, said lock being operable only when said neutral selection slide means is in an active position, shoulder means on said actuating means engageable with abutment means on said slide means for placing said neutral selection slide means in its neutral position, and safety catch means for preventing movement of said neutral selection slide means to an inactive position while said actuating means is in an active position, and means associated with said actuating means for releasing said safety catch means upon movement of said actuating means to an inactive position.

3. In a push button transmission selector unit having a plurality of drive selector slides and a neutral selector slide movably mounted in a housing, a sprag actuating lever pivotally mounted on said housing, cooperating abutment and shoulder means on said neutral selector slide and said lever respectively for moving said slide to its neutral position in response to movement of said lever to its sprag actuating position, and safety means resiliently mounted and adapted to engage said neutral selector slide as said lever and slide are moved to their active positions to prevent movement of said drive selector slides to their active positions.

References Cited in the file of this patent

UNITED STATES PATENTS

| | | |
|---|---|---|
| 2,653,689 | Hasbany | Sept. 29, 1953 |
| 2,670,064 | Hasbany | Feb. 23, 1954 |
| 2,910,885 | Bevacqua | Nov. 3, 1959 |
| 2,867,310 | Martin | Jan. 6, 1959 |